United States Patent
Lee et al.

(10) Patent No.: US 10,613,500 B2
(45) Date of Patent: Apr. 7, 2020

(54) METHOD AND SYSTEM FOR DETERMINING FAILURE OF SENSOR CONFIGURED TO MEASURE TEMPERATURE OF HEATING ELEMENT

(71) Applicants: Hyundai Motor Company, Seoul (KR); Kia Motors Corporation, Seoul (KR)

(72) Inventors: Dong Hun Lee, Gyeonggi-Do (KR); Chang Seok You, Gyeonggi-do (KR); Min Su Kang, Gyeonggi-do (KR); Sung Do Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 13 days.

(21) Appl. No.: 16/004,101

(22) Filed: Jun. 8, 2018

(65) Prior Publication Data
US 2019/0187642 A1 Jun. 20, 2019

(30) Foreign Application Priority Data
Dec. 20, 2017 (KR) .................. 10-2017-0175648

(51) Int. Cl.
| G05B 19/042 | (2006.01) |
| G01K 15/00 | (2006.01) |
| H05B 1/02 | (2006.01) |
| G05D 23/01 | (2006.01) |
| G05B 15/02 | (2006.01) |

(52) U.S. Cl.
CPC ......... G05B 19/042 (2013.01); G01K 15/007 (2013.01); G05B 15/02 (2013.01); G05B 19/0426 (2013.01); G05D 23/01 (2013.01); H05B 1/0288 (2013.01); G05B 2219/2648 (2013.01)

(58) Field of Classification Search
None
See application file for complete search history.

(56) References Cited

U.S. PATENT DOCUMENTS

| 7,379,685 B2 * | 5/2008 | Tatematsu ............ G03G 15/205 399/69 |
| 9,113,774 B2 * | 8/2015 | Goto .................... A61B 5/0008 |
| 2007/0036570 A1 * | 2/2007 | Tatematsu ............ G03G 15/205 399/69 |
| 2011/0158284 A1 * | 6/2011 | Goto .................... A61B 5/0008 374/163 |

(Continued)

FOREIGN PATENT DOCUMENTS

KR 100747229 B1 8/2007

*Primary Examiner* — Ramesh B Patel
(74) *Attorney, Agent, or Firm* — Mintz Levin Cohn Ferris Glovsky and Popeo, P.C.; Peter F. Corless

(57) ABSTRACT

A method for controlling a temperature of a heating element can include: measuring a temperature of the heating element using a temperature sensor; estimating a temperature of the heating element based on a heat transfer model of the heating element; calculating a variation of the estimated temperature and a variation of the measured temperature; and determining whether a failure of the temperature sensor occurs based on the calculated variation of the estimated temperature and the calculated variation of the measured temperature.

19 Claims, 4 Drawing Sheets

(56) References Cited

U.S. PATENT DOCUMENTS

| | | | | |
|---|---|---|---|---|
| 2012/0120379 A1* | 5/2012 | Phillips | F28F 3/12 | |
| | | | 355/52 | |
| 2015/0313474 A1* | 11/2015 | Goto | A61B 5/0008 | |
| | | | 600/549 | |
| 2015/0338289 A1* | 11/2015 | Friedrichs | G01K 15/002 | |
| | | | 702/99 | |
| 2016/0026093 A1* | 1/2016 | Hauf | G02B 7/008 | |
| | | | 355/52 | |
| 2017/0274573 A1* | 9/2017 | Takii | B29C 45/62 | |
| 2018/0242850 A1* | 8/2018 | Ellis | G01K 13/002 | |
| 2018/0252135 A1* | 9/2018 | Crawford | F01N 3/2026 | |

* cited by examiner

SWITCHING LOSS

CONDUCTION LOSS

METHOD AND SYSTEM FOR DETERMINING FAILURE OF SENSOR CONFIGURED TO MEASURE TEMPERATURE OF HEATING ELEMENT

CROSS REFERENCE TO RELATED APPLICATION

The present application claims the benefit of priority to Korean Patent Application No. 10-2017-0175648, filed on Dec. 20, 2017 in the Korean Patent Office, the entire contents of which are incorporated herein by reference.

BACKGROUND

Technical Field of the Disclosure

The present disclosure relates to a method and a system for controlling a temperature of a heating element, and more particularly, to techniques for determining whether a temperature sensor configured to measure a temperature of a heating element fails and controlling a cooling system on the basis of the determination result.

Description of the Related Art

A temperature sensor generally senses a voltage in order to measure a temperature in an environment such as a heating element in which an exothermic reaction occurs. Meanwhile, a cooling system for cooling the heating element can be controlled using the measured temperature of the heating element.

However, when the temperature sensor fails, the measured temperature is not reliable. Thus, the cooling system cannot be properly operated to control the temperature of the heating element.

A conventional method for detecting a failure of a temperature sensor when a voltage measured by the temperature sensor is close to a maximum voltage involves sensing a short circuit at a power supply circuit to which the temperature sensor is connected. When the measured voltage is close to 0, the conventional method involves sensing a disconnection at the power supply circuit or a short circuit at a circuit connected to a ground.

Alternatively, the conventional method detects failure of the temperature sensor using a measured value of another temperature sensor, which is expected to have a similar temperature, or using a measured value of a cooling water temperature sensor which measures a temperature of an inlet and an outlet of the cooling water.

However, according to the conventional method described above, there are problems in that it is impossible to determine whether a disconnection or a short circuit occurs within an actual temperature measurement range, and a degree of freedom to develop a corresponding system is reduced in terms of erroneously determining a failure or depending on another system when another temperature sensor fails. Further, when the measured value of the cooling water temperature sensor is used, there are problems in that it cannot detect which one of temperature sensors provided at the inlet and the outlet of the cooling water fails. This causes accurate and rapid failure sensing to be difficult since the temperature sensors are disturbed resulting from circulation of the cooling water.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art. The present disclosure proposes a method and a system for controlling a temperature of a heating element, which are capable of rapidly and accurately sensing a failure of a temperature sensor, which occurs within a measurement range of the temperature sensor, and performing an emergency operation of a cooling system when the temperature sensor is determined as failing.

According to embodiments of the present disclosure, a method for controlling a temperature of a heating element can include: measuring a temperature of the heating element using a temperature sensor; estimating a temperature of the heating element based on a heat transfer model of the heating element; calculating a variation of the estimated temperature and a variation of the measured temperature; and determining whether a failure of the temperature sensor occurs based on the calculated variation of the estimated temperature and the calculated variation of the measured temperature.

The estimating of the temperature of the heating element may include calculating a variation of internal energy of the heating element by subtracting a heat transfer amount flowing out of the heating element from a heating value of the heating element; and estimating the temperature of the heating element based on the calculated variation of the internal energy.

The calculating of the variation of internal energy of the heating element may include calculating the heat transfer amount flowing out of the heating element according to a difference between a previously estimated temperature of the heating element and a temperature of a cooling medium, and a thermal resistance coefficient.

A predetermined temperature value may be used as the temperature of the cooling medium.

The calculating of the variation of the estimated temperature may include calculating a variation of a temperature of the heating element, which is previously estimated at a time corresponding to a delay time occurring in the measuring of the temperature of the heating element using the temperature sensor.

The heating element may be an insulated gate bipolar transistor (IGBT), and the estimating of the temperature of the heating element may include calculating a heating value of the IGBT according to a sum of a switching loss and a conduction loss, which are calculated based on a current sensed at the IGBT.

The switching loss of the IGBT may be calculated using the following equation:

$$P_{SW\_loss} = 6 \times f_{SW} \times \frac{(E_{T\_On} + E_{T\_Off} + E_D)}{\pi} \times \frac{V_{DC}}{V_{DC\_Ref}},$$

wherein $P_{SW\_loss}$ is a switching loss value (W) of the IGBT, $f_{SW}$ is a switching frequency (Hz) of the IGBT, $E_{T\_On}$ is turn-on switching loss energy (J) of the IGBT, $E_{T\_Off}$ is turn-off switching loss energy (J) of the IGBT, $E_D$ is switching loss energy (J) of a diode of the IGBT, $V_{DC}$ is a measured voltage value (V) of a high voltage direct current (DC) stage, and $V_{DC\_Ref}$ is a reference voltage (V) of the high voltage DC stage in a switching loss energy measurement condition.

The conduction loss of the IGBT may be calculated using the following equation:

$$P_{Con\_loss} = 6 \times \left\{ \frac{I_{max}}{2\pi} \times (V_{T\_ceo} + V_{Do}) + \frac{I_{max}}{8} \times (V_{T\_ceo} - V_{Do}) \times m \times \cos\theta + \frac{I_{max}^2}{8} \times (R_T + R_D) + \frac{I_{max}^2}{3\pi} \times (R_T - R_D) \times m \times \cos\theta \right\}$$

Wherein $P_{Con\_loss}$ is a conduction (transmission) loss value (W) of the IGBT, $I_{max}$ is a maximum three-phase sinusoidal current value (A) of a motor, $V_{T\_ceo}$ is a voltage difference (V) between a collector and an emitter of an active element of the IGBT on the basis of a current of 0 A, $V_{Do}$ is a voltage difference (V) between both ends of the diode of the IGBT when a current is 0 A, $R_T$ is a slope of a current according to the voltage difference between the collector and the emitter of the IGBT, $R_D$ is a slope of a current of the voltage difference between both of the ends of the diode of the IGBT, m is a voltage utilization rate, and $\theta$ is a phase difference between a three-phase current and a three-phase voltage.

The determining of whether the failure of the temperature sensor occurs may include calculating a ratio between the variation of the estimated temperature and the variation of the measured temperature; and, when a magnitude of an absolute value of the calculated ratio exceeds a predetermined value, determining the temperature sensor as failing.

The calculating of the ratio between the variation of the estimated temperature and the variation of the measured temperature may include comparing a magnitude of the variation of the estimated temperature with a magnitude of the variation of the measured temperature; dividing the larger of the magnitude of the variation of the estimated temperature and the magnitude of the variation of the measured temperature by the smaller of the magnitude of the variation of the estimated temperature and the magnitude of the variation of the measured temperature; and calculating a magnitude of a value obtained by subtracting 1 from the divided value, the ratio between the variation of the estimated temperature and the variation of the measured temperature corresponding to the calculated magnitude.

The determining of whether the failure of the temperature sensor occurs may include determining the temperature sensor as failing when the magnitude of the absolute value of the ratio between the calculated variation of the estimated temperature and the calculated variation of the measured temperature exceeds the predetermined value for a predetermined reference time.

The determining of whether the failure of the temperature sensor occurs may include determining the temperature sensor as failing when a magnitude of an average absolute value of the ratio between the variation of the estimated temperature and the variation of the measured temperature is greater than a predetermined value for a predetermined determination time.

The method may further include, after the determining of whether the failure of the temperature sensor occurs, controlling a cooling system configured to cool the heating element. When the temperature sensor is determined as not failing, the controlling of the cooling system may be performed based on the measured temperature.

When the temperature sensor is determined as failing, the controlling of the cooling system may be performed based on the estimated temperature.

When the temperature sensor is determined as failing, the controlling of the cooling system may be performed based on a predetermined temperature value of the heating element.

Furthermore, according to embodiments of the present disclosure, a system for controlling a temperature of a heating element can include: a heating element in which an exothermic reaction is performed, a temperature sensor configured to measure a temperature of the heating element, and a controller configured to estimate a temperature of the heating element based on a heat transfer model of the heating element, calculate a variation of the estimated temperature and a variation of the measured temperature, and determine whether a failure of the temperature sensor occurs based on the calculated variation of the estimated temperature and the calculated variation of the measured temperature.

The heating element may be an insulated gate bipolar transistor (IGBT), the system may further include a current sensor configured to sense a current of the IGBT, and the controller may calculate a heating value of the IGBT according to a sum of a switching loss and a conduction loss of the heating element, which are calculated based on the current sensed at the current sensor.

The controller may calculate a ratio between the variation of the estimated temperature and the variation of the measured temperature, and, when a magnitude of the ratio between the calculated variation of the estimated temperature and the calculated variation of the measured temperature exceeds a predetermined value, the controller may determine the temperature sensor as failing.

The system may further include a cooling system configured to cool the heating element, wherein the controller may control the cooling system based on the measured temperature when the temperature sensor is determined as not failing, and controls the cooling system based on the estimated temperature or a predetermined temperature value of the heating element when the temperature sensor is determined as failing.

BRIEF DESCRIPTION OF THE DRAWINGS

The above and other objects, features and other advantages of the present disclosure will be more clearly understood from the following detailed description when taken in conjunction with the accompanying drawings, in which.

Figure 1:
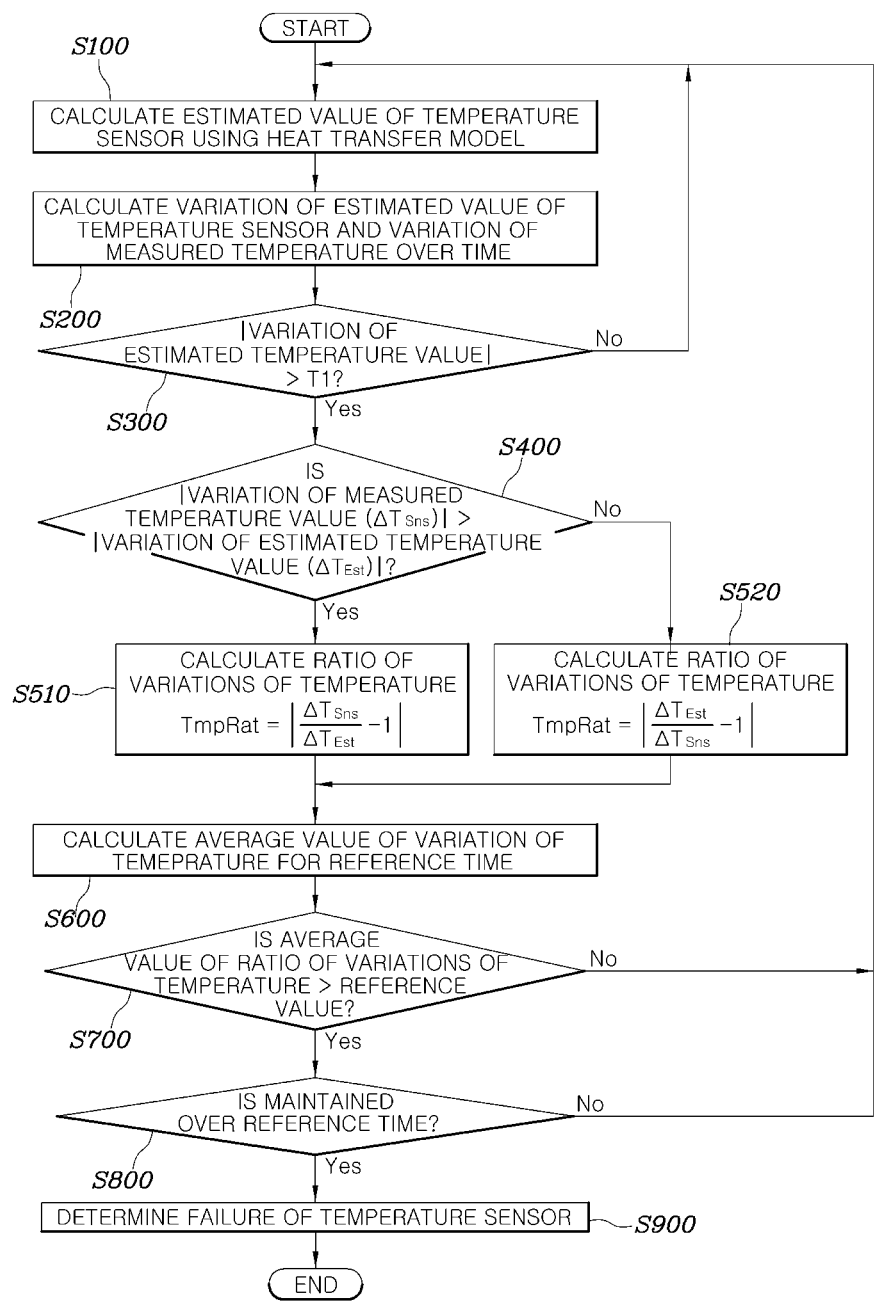
FIG. 1 is a flowchart for determining a failure of a temperature sensor according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Specific structural and functional descriptions of the embodiments of the present disclosure disclosed in this disclosure or application are illustrative only for the purpose of describing the embodiments, and the embodiments according to the present disclosure may be implemented in various forms and should not be construed as being limited to embodiments described in this disclosure or application.

The embodiments according to the present disclosure may be variously modified and may have various forms, so that specific embodiments will be illustrated in the drawings and be described in detail in this disclosure or application. It should be understood, however, that it is not intended to limit the embodiments according to the concept of the present disclosure to specific disclosure forms, but it includes all modifications, equivalents, and alternatives falling within the spirit and scope of the present disclosure.

The terms first, second, and/or the like may be used to describe various components, but the components should not be limited by these terms. These terms may be used only for the purpose of distinguishing one component from another component, and, for example, a first component may be referred to as a second element, and similarly, the second component may also be referred to as the first component without departing from the scope of the present disclosure.

When a component is referred to as being "connected," or "coupled" to other component, it may be directly connected or coupled to the other component, but it should be understood that another component may exist between the component and the other component. Contrarily, when a component is referred to as being "directly connected," or "directly coupled" to other component, it should be understood that another component may be absent between the component and the other component. Other expressions describing the relationship between components, that is, "between" and "immediately between," or "adjacent to" and "directly adjacent to" should also be construed as described above.

Terms used herein is used only for the purpose of describing specific embodiments, and are not intended to limit the present disclosure. Unless the context clearly dictates otherwise, the singular form includes the plural form. In this description, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Unless defined otherwise, all terms including technical or scientific terms used herein have the same meaning as commonly understood by those skill in the art to which the present disclosure pertains. General terms that are defined in a dictionary shall be construed to have meanings that are consistent in the context of the relevant art, and will not be interpreted as having an idealistic or excessively formalistic meaning unless clearly defined in the present disclosure.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, embodiments of the present disclosure will be described in detail with reference to the accompanying drawings. Like reference numerals denote like members throughout the drawings.

FIG. 1 is a flowchart for determining a failure of a temperature sensor according to embodiments of the present disclosure.

As shown in FIG. 1, a method for controlling a temperature of a heating element according to embodiments of the present disclosure includes estimating a temperature of a heating element on the basis of a heat transfer model of the heating element (S100), calculating a variation of the estimated temperature and a variation of a temperature measured by a temperature sensor which is configured to measure a temperature of the heating element (S200), and determining whether a failure of the temperature sensor occurs on the basis of the calculated variation of the estimated temperature and the calculated variation of the measured temperature (S900).

An insulated gate bipolar transistor (IGBT) which is a high-speed switching element used in a motor drive inverter or a direct current (DC)/DC converter will be described as an example of the heating element of the present disclosure, although the heating element is not limited thereto. The method according to the present disclosure is applicable to systems in which an exothermic reaction occurs, such as a resistor, an engine, a fuel cell stack, and the like, in addition to the IGBT.

The temperature sensor of the present disclosure is a sensor configured to sense a temperature for use in cooling control of a cooling system to maintain a temperature of the heating element in an appropriate range. The cooling system may use various cooling medium such as water, air, or the like, and may include a circulation pump configured to circulate the cooling medium, a radiator, a radiator fan, and a bypass flow path and a control valve for changing a flow path of the cooling medium.

In the estimating of the temperature of the heating element (S100), the temperature of the heating element may be estimated on the basis of the heat transfer model of the heating element. Specifically, a variation of internal energy of the heating element may be calculated by subtracting a heat transfer amount flowing out of the heating element from a heating value of the heating element, and a temperature of the heating element may be estimated from the variation of the internal energy.

The heat transfer amount flowing out of the heating element may be calculated using a difference between a previously estimated temperature of the heating element and a temperature of a cooling medium, and a thermal resistance coefficient. Here, a predetermined temperature value may be used as the temperature of the cooling medium. That is, the temperature of the cooling medium may be a fixed value rather than an actually measured value. Specifically, a plurality of values are preset as the predetermined temperature value according to a situation when a cold starting is performed or when a sufficient starting has been completed, and may be differently used according to the situation.

Since the cooling medium generally has a sufficient flow rate, and thus a variation in temperature of the cooling medium is relatively small than a variation in temperature of the heating element, accuracy may be reliable even when a fixed value is used. Further, since a sensor configured to measure the temperature of the cooling medium is not additionally required, there is a possibility that a cooling medium temperature sensor also fails even through the sensor is additionally installed, and the measured value is inaccurate. Therefore, a more accurate failure detection is possible when the fixed value is used.

That is, the following equation, in which a variation of an internal energy of the heating element is obtained by subtracting a heat transfer amount flowing out the outside from a heating value of the heating element, may be derived using the first law of thermodynamics.

$$P - Q_{out} = C \times \frac{(T_{now} - T_{old})}{t_{smp}} + \frac{(T_{old} - T_{Clt\_ref})}{R}$$

Here, P is the heating value [W] of the heating element, $Q_{out}$ is the heat transfer amount [W] flowing out to the outside, C is a heat capacity coefficient [J/K] of the heating element, $T_{now}$ is a current temperature (an estimated value) [° C.] of the heating element, $T_{old}$ is a previous temperature (an estimated value) [° C.] of the heating element, $t_{smp}$ is a calculation period (a sampling time), $T_{clt\_ref}$ is a reference temperature [° C.] of the cooling medium, and R is a thermal resistance coefficient [K/W] between the heating element and the cooling medium.

The estimated temperature Tnow of the heating element may be estimated through the derived equation.

The heating element is an IGBT, and, in the estimating of the temperature of the heating element (S100), a heating value of the IGBT may be assumed as the sum of a switching loss and a conduction loss which are calculated on the basis of a current sensed at the IGBT.

Figure 2:
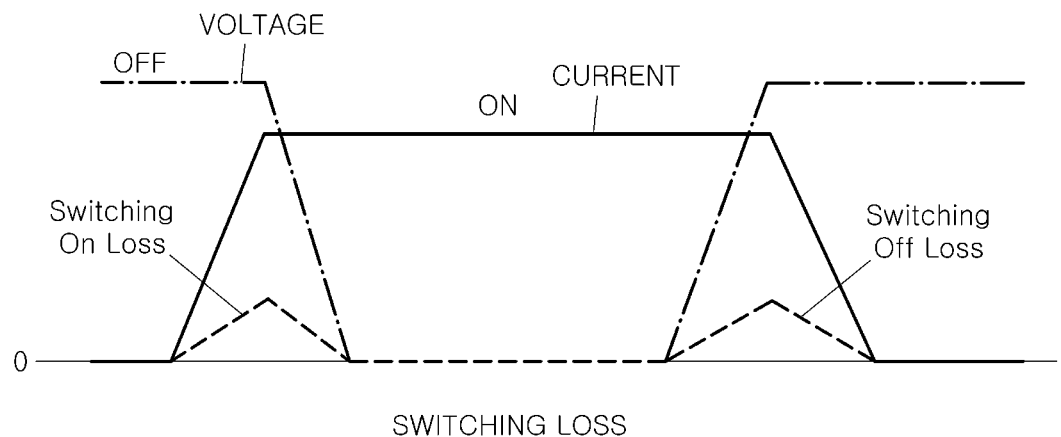
FIG. 2 is a graph illustrating a switching loss of an insulated gate bipolar transistor (IGBT)
Figure 3:
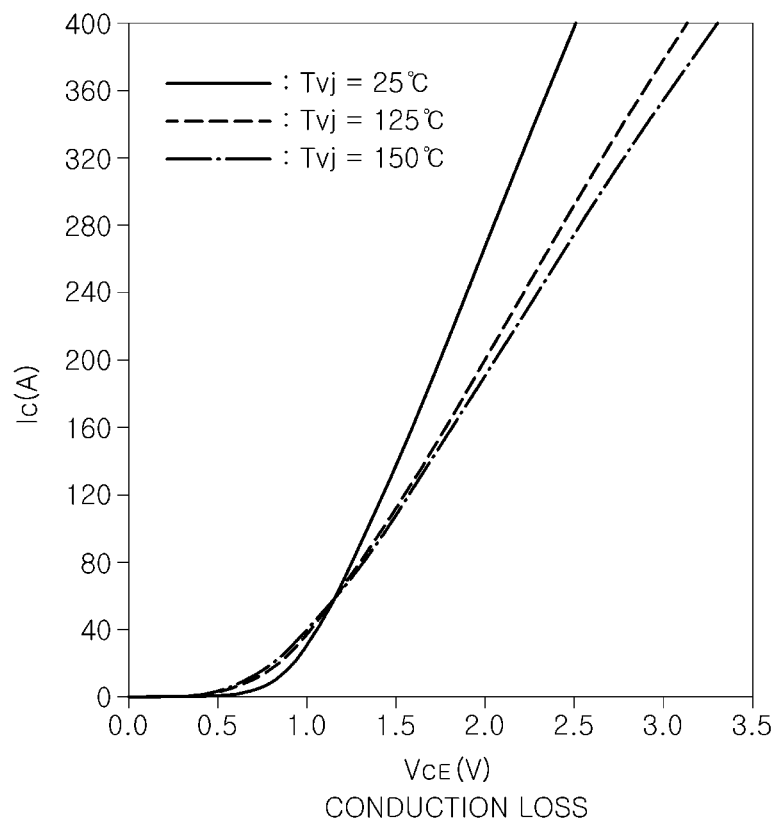
FIG. 3 is a graph illustrating a conduction loss of the IGBT.

FIG. 2 is a graph illustrating the switching loss of the IGBT, and FIG. 3 is a graph illustrating the conduction loss of the IGBT.

As shown in FIGS. 2 to 3, when a turn-on/off switching is generated in high-speed to control an input voltage of a three-phase motor, a switching loss of the IGBT included in an inverter configured to drive the three-phase motor refers to a loss value occurring at a time when a current flows or is blocked at an instant when the turn-on/off switching is generated. The switching loss of the IGBT includes both a switching-on loss generated when the IGBT is turned on and a switching-off loss generated when the IGBT is turned off, and the switching loss is generated since the IGBT is not an ideal switch.

Specifically, the switching loss of the IGBT may be calculated using the following equation.

$$P_{SW\_loss} = 6 \times f_{SW} \times \frac{(E_{T\_On} + E_{T\_Off} + E_D)}{\pi} \times \frac{V_{DC}}{V_{DC\_Ref}}$$

Here, $P_{SW\_loss}$ is a switching loss value (W) of the IGBT, $f_{SW}$ is a switching frequency (Hz) of the IGBT, $E_{T\_On}$ is turn-on switching loss energy (J) of the IGBT, $E_{T\_Off}$ is turn-off switching loss energy (J) of the IGBT, $E_D$ is switching loss energy (J) of a diode of the IGBT, $V_{DC}$ is a measured voltage value (V) of a high voltage direct current (DC) stage, and $V_{DC\_Ref}$ is a reference voltage (V) of the high voltage DC stage in a switching loss energy measurement condition.

Here, $E_{T\_On}$, $E_{T\_Off}$ and $E_D$ are values varied according to an input voltage or an output current of the DC stage, and values measured through the experiment may be used. Generally, values experimented by a manufacturer of the IGBT may be used.

Further, the conduction loss refers to a loss that is generated by a voltage drop between a collector and an emitter of a switching element, which occurs according to an amount of current when a current flows through the switching element. The conduction loss of the IGBT may be calculated using the following equation.

$$P_{Con\_loss} = 6 \times \left\{ \frac{I_{max}}{2\pi} \times (V_{T\_ceo} + V_{Do}) + \frac{I_{max}}{8} \times (V_{T\_ceo} - V_{Do}) \times m \times \cos\theta + \frac{I_{max}^2}{8} \times (R_T + R_D) + \frac{I_{max}^2}{3\pi} \times (R_T - R_D) \times m \times \cos\theta \right\}$$

Here, $P_{Con\_loss}$ is a conduction (transmission) loss value (W) of the IGBT, $I_{max}$ is a three-phase sinusoidal current value (A) of a motor, $V_{T\_ceo}$ is a voltage difference (V) between a collector and an emitter of an active element of the IGBT on the basis of a current of 0 A, $V_{Do}$ is a voltage difference (V) between both ends of the diode of the IGBT when a current is 0 A, $R_T$ is a slope of a current according to the voltage difference between the collector and the emitter of the IGBT, $R_D$ is a slope of a current of the voltage difference between both of the ends of the diode of the IGBT, m is a voltage utilization rate, and θ is a phase difference (in degrees) between the three-phase current and the three-phase voltage.

Values measured through an experiment may be used as $V_{T\_ceo}$, $V_{Do}$, $R_T$, and $R_D$. Generally, values experimented by a manufacturer of the IGBT may be used.

The determining of whether the failure of the temperature sensor occurs (S900) includes calculating a ratio between the variation of the estimated temperature and the variation of the measured temperature (S510 and S520), and, when a magnitude of an absolute value of the ratio between the calculated variation of the estimated temperature and the calculated variation of the measured temperature exceeds a predetermined value, determining the temperature sensor as failing (S900). The ratio between the variation of the estimated temperature and the variation of the measured temperature may be calculated (S300) only when the variation of the estimated temperature is over a predetermined level T1. This is to prevent occurrence of a large error due to a very small variation.

Specifically, the calculating of the ratio between the variation of the estimated temperature and the variation of the measured temperature (S510 and S520) may include comparing a magnitude of the variation of the estimated temperature with that of the variation of the measured temperature (S400), dividing a the larger variation of the variations of the estimated temperature and the measured temperature by the smaller variation thereof (S510, S520), and calculating a magnitude obtained by subtracting 1 from the divided value as the ratio between the variation of the estimated temperature and the variation of the measured temperature.

Specifically, when the magnitude of the variation $\Delta T_{Est}$ of the estimated temperature is larger than that of the variation $\Delta T_{Sns}$ of the measured temperature ($|\Delta T_{Sns}|>|\Delta T_{Est}|$), the ratio TmpRat between the variation of the estimated temperature and the variation of the measured temperature may be calculated using the following equation (S510).

$$TmpRat = \left|\frac{\Delta T_{Sns}}{\Delta T_{Est}} - 1\right|$$

Meanwhile, when the magnitude of the variation $\Delta T_{Sns}$ of the measured temperature is larger than or less than that of the variation $\Delta T_{Est}$ of the estimated temperature, the ratio TmpRat between the variation of the estimated temperature and the variation of the measured temperature may be calculated using the following equation (S520).

$$TmpRat = \left|\frac{\Delta T_{Est}}{\Delta T_{Sns}} - 1\right|$$

As described above, the ratio TmpRat between the variation of the estimated temperature and the variation of the measured temperature is calculated by comparing the absolute value of the variation $\Delta T_{Sns}$ of the measured temperature with that of the variation $\Delta T_{Est}$ of the estimated temperature using the different equations so as to make a ratio between the two variations have a value greater than 1.

The reason for the above-described calculation is that, when the ratio TmpRat between the variation $\Delta T_{Est}$ of the estimated temperature and the variation $\Delta T_{Sns}$ of the measured temperature is calculated using the same equation regardless of the magnitudes of the variations of the two temperatures, the difference between the variation of the estimated temperature and the variation of the measured temperature may be kept constant but the ratio TmpRat between the variation $\Delta T_{Est}$ of the estimated temperature and the variation $\Delta T_{Sns}$ of the measured temperature may be significantly increased between when the variation of the measured temperature is large and when the variation of the estimated temperature is large. Specifically, the ratio TmpRat increases to infinity, or otherwise, the ratio TmpRat exhibits a small value in a range of 1 to 2 such that there occurs a problem in that a failure detection is difficult. Accordingly, since the different equations are used according to the magnitude comparison result, the ratio TmpRat between the variation of the estimated temperature and the variation of the measured temperature may be increased as an error between the variation $\Delta T_{Sns}$ of the measured temperature and the variation $\Delta T_{Est}$ of the estimated temperature is increased.

Further, the reason for calculating the absolute value of the value obtained by subtracting 1 is that a probability of a failure of the temperature sensor is higher when a sign of the variation $\Delta T_{Sns}$ of the measured temperature is different from that of the variation $\Delta T_{Est}$ of the estimated temperature. For example, when 1 is not subtracted, both a case in which a sign of the variation $\Delta T_{Sns}$ of the measured temperature is the same as that of the variation $\Delta T_{Est}$ of the estimated temperature and a case in which the sign of the variation $\Delta T_{Sns}$ of the measured temperature is different from that of the variation $\Delta T_{Est}$ of the estimated temperature may be calculated as 1.

However, in a case in which 1 is subtracted and the absolute values are calculated, 0 is calculated when the signs are the same as each other and 2 is calculated when the signs are different from each other, so that this may be a more accurate indicator for detecting the failure of the temperature sensor.

A failure determination reference value of the ratio $T_{mpRat}$ between the variation of the estimated temperature and the variation of the measured temperature may be set to a value in a range of about 10 or more. A minor failure of the temperature sensor may be detected as the failure determination reference value becomes smaller, but a probability of false detection may be increased. On the other hand, when the failure determination reference value is set to be larger, the possibility of false detection may become lower but there occurs a problem in that only a serious failure may be detected. Generally, when a consistency failure in which a failure of the temperature sensor occurs within a normal range occurs, since the ratio $T_{mpRat}$ between the variation of the estimated temperature and the variation of the measured temperature is calculated as several tens or more, a failure detection may be possible when the failure determination reference value is set to a value in a range of about 10 or more. In a case in which the failure determination reference value is experimentally determined, the ratio $T_{mpRat}$ is stably calculated as 1 or less when the temperature sensor is in a normal state.

Further, a measurement delay occurs during the measurement of the temperature sensor due to a sensing delay of the temperature sensor and a software delay generated by a low-pass filter of a central processing unit (CPU) which reads a sensed value to perform a control operation. Therefore, a time delay compensation for the temperature measurement should be performed as part of the calculation of the ratio $T_{mpRat}$. The ratio TmpRat between the variation of the estimated temperature and the variation of the measured temperature may be accurately calculated through a temperature estimated at a previous time corresponding to a measurement delay of the temperature sensor on the basis of a current time and a currently measured value of the temperature sensor by applying a time delay corresponding to the measurement delay of the temperature sensor to the estimated temperature.

Therefore, in the calculating of the variation of the estimated temperature, the delay time occurring in the measurement of the temperature sensor is reflected, and a variation in temperature of the heating element previously estimated at a time corresponding to the delay time occurring in the measurement of the temperature sensor is calculated, so that the ratio TmpRat between the variation of the estimated temperature and the variation of the measured temperature may be calculated.

Further, the determining of whether the failure of the temperature sensor occurs (S900) may include determining a failure of the temperature sensor when a magnitude of the ratio $T_{mpRat}$ between the variation of the estimated temperature and the variation of the measured temperature exceeds a predetermined value over a reference time (S800). Alternatively, an average value of the ratio $T_{mpRat}$ between the variation of the estimated temperature and the variation of the measured temperature for a predetermined time on the basis of a current time may be used (S600).

As another example, the determining of whether the failure of the temperature sensor occurs (S900) may include determining a failure of the temperature sensor when a magnitude of an average absolute value of the ratio $T_{mpRat}$ between the variation of the estimated temperature and the variation of the measured temperature for a predetermined determination time is greater than a predetermined value (S700). That is, a moving average value of the ratio $T_{mpRat}$ between the variation of the estimated temperature and the variation of the measured temperature for a determination time may be calculated to remove noise, and the failure of the temperature sensor may be determined on the basis of the moving average value.

The average absolute value and the moving average value may be selectively or simultaneously used. This is to prevent a false detection for the failure of the temperature sensor due to a peak value of a ratio between an instantaneous variation of the estimated temperature and the variation of the measured temperature, wherein the instantaneous variation of the estimated temperature may occur even in a normal temperature sensor due to instantaneous noise of a measured value of the temperature sensor, a sensing delay of the measured value of the temperature sensor, and the like.

After the determining of whether the failure of the temperature sensor occurs (S900), controlling a cooling system configured to cool the heating element (not shown) may be performed. In this regard, when the temperature sensor is determined as not failing, the cooling system may be controlled on the basis of the measured temperature. However, when the temperature sensor is determined as failing, the cooling system (not shown) may be controlled on the basis of the estimated temperature.

Alternatively, when the temperature sensor is determined as failing, the cooling system may be controlled by assuming that the temperature of the heating element is a predetermined temperature value.

First, when a failure of the temperature sensor is detected, a corresponding failure code may be stored in a non-volatile memory. Further, a failure state may be notified through a separate recognizable means so as to allow a user to recognize the failure.

When the temperature sensor is in a normal state, the cooling system may be controlled using a temperature value measured by the temperature sensor. Specifically, the cooling system may be controlled through proportional integral (PI) control by setting a target temperature of the heating element, or may be controlled in a linear or stepwise manner as the temperature of the heating element rises. For example, a rotational speed of the cooling pump or a fan of the radiator may be controlled.

When the temperature sensor is determined as failing, since the temperature value measured by the temperature sensor is unreliable, the cooling system may be controlled on the basis of the estimated temperature. As in the above, the cooling system may be controlled through the PI control or may be controlled in the linear or stepwise manner as the temperature of the heating element rises.

Alternatively, when the temperature sensor is determined as failing, the cooling system may be controlled by assuming that the temperature of the heating element is a predetermined temperature value. That is, the cooling system may be controlled to operate by assuming that the temperature of the heating element is the predetermined temperature value at which cooling performance of a certain level or more is secured. The predetermined temperature value may be set to an appropriate level in consideration of securing performance of cooling the heating element and power consumption efficiency.

Figure 4:
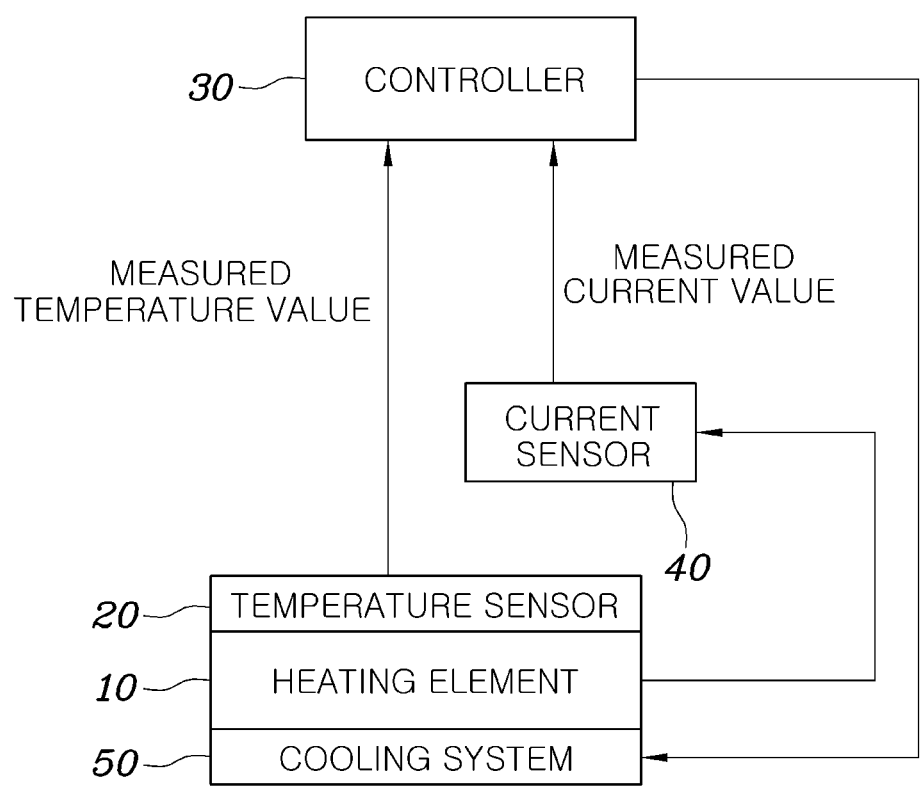
FIG. 4 is a configurational diagram illustrating a system for controlling a temperature of a heating element according to embodiments of the present disclosure.

FIG. 4 is a configurational diagram illustrating a system for controlling a temperature of a heating element according to embodiments of the present disclosure.

As shown in FIG. 4, the system for controlling a temperature of a heating element according to embodiments of the present disclosure may include a heating element 10 in which an exothermic reaction occurs, a temperature sensor 20 configured to measure a temperature of the heating element 10, and a controller 30 configured to estimate a temperature of the heating element 10 on the basis of a heat transfer model of the heating element 10, calculate a variation of the estimated temperature and a variation of the temperature measured at the temperature sensor 20, and determine whether a failure of the temperature sensor 20 occurs on the basis of the calculated variation of the estimated temperature and the calculated variation of the measured temperature.

The controller 30 may calculate a ratio between the variation of the estimated temperature and the variation of the measured temperature, and, when a magnitude of the calculated ratio between the variation of the estimated temperature and the variation of the measured temperature exceeds a predetermined value, the controller 30 may determine the temperature sensor 20 as failing.

The heating element 10 may be an IGBT, a current sensor 40 configured to sense a current of the IGBT may further be included, and the controller 30 may assume that the sum of a switching loss and a conduction loss of the heating element 10, which are calculated on the basis of the current sensed by the current sensor 40, is a heating value of the IGBT.

The current sensor 40 may sense a three-phase current so as to calculate the heating value of the IGBT. When the heating element 10 is not the IGBT, another sensor may be employed by replacing with the current sensor 40.

A cooling system 50 configured to cool the heating element 10 may further be included. When the temperature sensor 20 is determined as not failing, the controller 30 may control the cooling system 50 on the basis of the measured temperature. However, when the temperature sensor 20 is determined as failing, the controller 30 may control the cooling system 50 on the basis of the estimated temperature or by assuming that the temperature of the heating element 10 is the predetermined temperature value.

Hereinafter, a description overlapping with that of the method for controlling a temperature of a heating element will be omitted.

Figure 5:
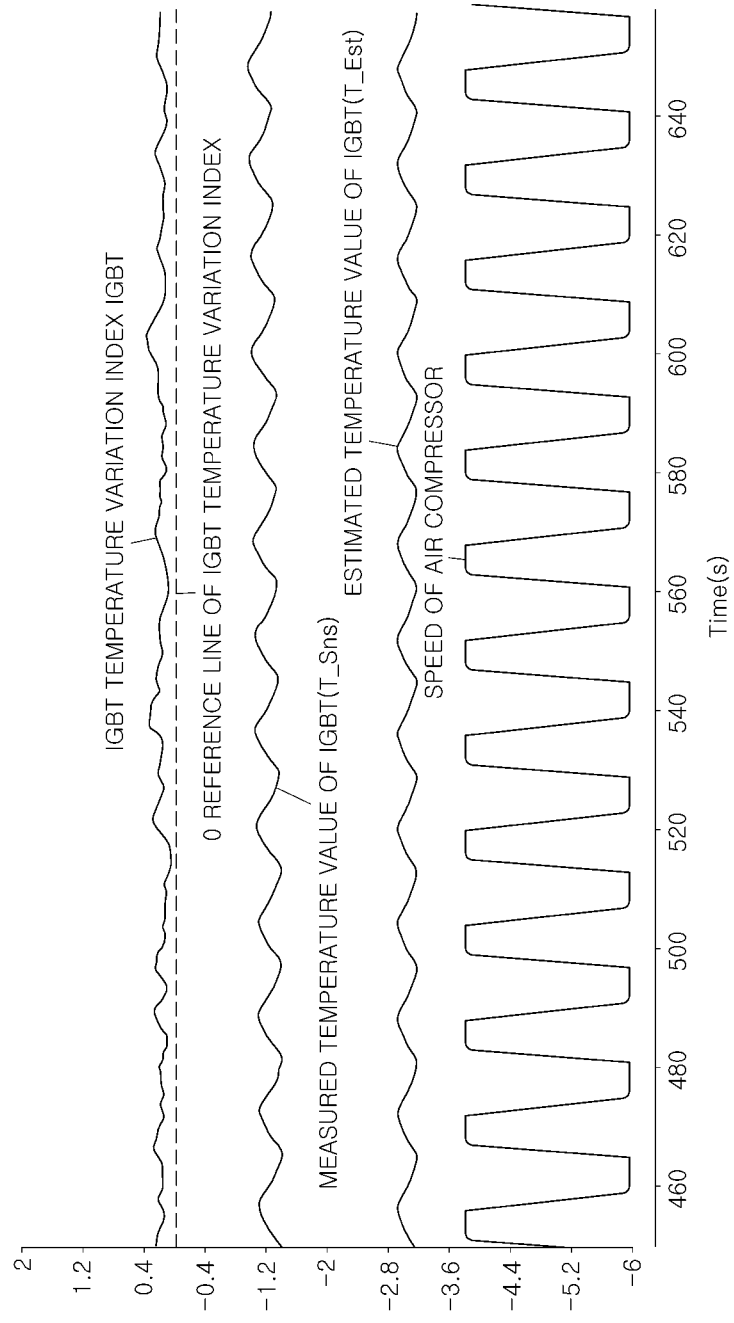
FIG. 5 is a graph illustrating a result of using the method or the system for controlling a temperature of a heating element according to embodiments of the present disclosure.

FIG. 5 is a graph illustrating a result of using the method or the system for controlling a temperature of a heating element according to embodiments of the present disclosure.

As shown in FIG. 5, the heating element is an IGBT included in an inverter of a motor for driving an air compressor, and the present disclosure is applied under an operating condition in which a temperature of the IGBT is varied by continuously varying a speed of the air compressor.

As the result of calculation of a measured temperature value and an estimated value of the IGBT and verification of a failure diagnosis function, a variation of the estimated temperature is very similar to that of the measured temperature in a normal state, so that a temperature variation index is calculated as a value around 0 and not to exceed 0.4 at maximum.

Therefore, in accordance with embodiments of the present disclosure, a failure of the temperature sensor is not detected in a normal state even though the control of the IGBT is continuously varied, thus ensuring consistent determinations.

In accordance with the method and the system for controlling a temperature of a heating element, a failure occurring within a measurement range of the temperature sensor can be reliably sensed. Further, the temperature of the heating element can be sensed by only the system without depending on other sensors, so that there is a freedom of design of the system without additional sensors. Furthermore, a possibility of a false detection in sensing a failure of the temperature sensor due to noise or disturbance can be minimized.

Although specific embodiments of the present disclosure have been described and illustrated, those skilled in the art will appreciate that various alternations and modifications are possible without departing from the technical spirit of the present disclosure as disclosed in the appended claims.

What is claimed is:

1. A method for determining whether a temperature sensor fails, the method comprising:
   measuring a temperature of a heating element using the temperature sensor;
   estimating a temperature of the heating element based on a heat transfer model of the heating element;
   calculating a variation of the estimated temperature and a variation of the measured temperature; and
   determining whether a failure of the temperature sensor occurs based on the calculated variation of the estimated temperature and the calculated variation of the measured temperature.

2. The method of claim 1, wherein the estimating of the temperature of the heating element comprises:
   calculating a variation of internal energy of the heating element by subtracting a heat transfer amount flowing out of the heating element from a heating value of the heating element; and
   estimating the temperature of the heating element based on the calculated variation of the internal energy.

3. The method of claim 2, wherein the calculating of the variation of internal energy of the heating element comprises calculating the heat transfer amount flowing out of the heating element according to a difference between a previously estimated temperature of the heating element and a temperature of a cooling medium, and a thermal resistance coefficient.

4. The method of claim 3, wherein a predetermined temperature value is used as the temperature of the cooling medium.

5. The method of claim 1, wherein the calculating of the variation of the estimated temperature comprises calculating a variation of a temperature of the heating element, which is previously estimated at a time corresponding to a delay time occurring in the measuring of the temperature of the heating element using the temperature sensor.

6. The method of claim 1, wherein:
   the heating element is an insulated gate bipolar transistor (IGBT), and
   the estimating of the temperature of the heating element comprises calculating a heating value of the IGBT according to a sum of a switching loss and a conduction loss, which are calculated based on a current sensed at the IGBT.

7. The method of claim 6, wherein the switching loss of the IGBT is calculated using the following equation:

$$P_{SW\_loss} = 6 \times f_{SW} \times \frac{(E_{T\_On} + E_{T\_Off} + E_D)}{\pi} \times \frac{V_{DC}}{V_{DC\_Ref}},$$

wherein $P_{SW\_loss}$ is a switching loss value (W) of the IGBT, $f_{SW}$ is a switching frequency (Hz) of the IGBT, $E_{T\_On}$ is turn-on switching loss energy (J) of the IGBT, $E_{T\_Off}$ is turn-off switching loss energy (J) of the IGBT, $E_D$ is switching loss energy (J) of a diode of the IGBT, $V_{DC}$ is a measured voltage value (V) of a high voltage direct current (DC) stage, and $V_{DC\_Ref}$ is a reference voltage (V) of the high voltage DC stage in a switching loss energy measurement condition.

8. The method of claim 6, wherein the conduction loss of the IGBT is calculated using the following equation:

$$P_{Con\_loss} = 6 \times \left\{ \frac{I_{max}}{2\pi} \times (V_{T\_ceo} + V_{Do}) + \frac{I_{max}}{8} \times (V_{T\_ceo} - V_{Do}) \times m \times \cos\theta + \frac{I_{max}^2}{8} \times (R_T + R_D) + \frac{I_{max}^2}{3\pi} \times (R_T - R_D) \times m \times \cos\theta \right\},$$

wherein $P_{Con\_loss}$ is a conduction (transmission) loss value (W) of the IGBT, $I_{max}$ is a three-phase sinusoidal current value (A) of a motor, $V_{T\_ceo}$ is a voltage difference (V) between a collector and an emitter of an active element of the IGBT on the basis of a current of 0 A, $V_{Do}$ is a voltage difference (V) between both ends of the diode of the IGBT when a current is 0 A, $R_T$ is a slope of a current according to the voltage difference between the collector and the emitter of the IGBT, $R_D$ is a slope of a current of the voltage difference between both of the ends of the diode of the IGBT, m is a voltage utilization rate, and θ is a phase difference between a three-phase current and a three-phase voltage.

9. The method of claim 1, wherein the determining of whether the failure of the temperature sensor occurs comprises:
   calculating a ratio between the variation of the estimated temperature and the variation of the measured temperature; and
   when a magnitude of an absolute value of the calculated ratio exceeds a predetermined value, determining the temperature sensor as failing.

10. The method of claim 9, wherein the calculating of the ratio between the variation of the estimated temperature and the variation of the measured temperature comprises:
   comparing a magnitude of the variation of the estimated temperature with a magnitude of the variation of the measured temperature;
   dividing the larger of the magnitude of the variation of the estimated temperature and the magnitude of the variation of the measured temperature by the smaller of the magnitude of the variation of the estimated temperature and the magnitude of the variation of the measured temperature; and calculating a magnitude of a value obtained by subtracting 1 from the divided value, the ratio between the variation of the estimated temperature and the variation of the measured temperature corresponding to the calculated magnitude.

11. The method of claim 9, wherein the determining of whether the failure of the temperature sensor occurs comprises determining the temperature sensor as failing when the magnitude of the absolute value of the ratio between the calculated variation of the estimated temperature and the calculated variation of the measured temperature exceeds the predetermined value for a predetermined reference time.

12. The method of claim 9, wherein the determining of whether the failure of the temperature sensor occurs comprises determining the temperature sensor as failing when a magnitude of an average absolute value of the ratio between the variation of the estimated temperature and the variation of the measured temperature is greater than a predetermined value for a predetermined determination time.

13. The method of claim 1, further comprising:
after the determining of whether the failure of the temperature sensor occurs, controlling a cooling system configured to cool the heating element,
wherein, when the temperature sensor is determined as not failing, the controlling of the cooling system is performed based on the measured temperature.

14. The method of claim 13, wherein, when the temperature sensor is determined as failing, the controlling of the cooling system is performed based on the estimated temperature.

15. The method of claim 13, wherein, when the temperature sensor is determined as failing, the controlling of the cooling system is performed based on a predetermined temperature value of the heating element.

16. A system for determining whether a temperature sensor fails, the system comprising:
a heating element in which an exothermic reaction is performed;
the temperature sensor configured to measure a temperature of the heating element; and
a controller configured to estimate a temperature of the heating element based on a heat transfer model of the heating element, calculate a variation of the estimated temperature and a variation of the measured temperature, and determine whether a failure of the temperature sensor occurs based on the calculated variation of the estimated temperature and the calculated variation of the measured temperature.

17. The system of claim 16, wherein:
the heating element is an insulated gate bipolar transistor (IGBT),
the system further includes a current sensor configured to sense a current of the IGBT, and
the controller calculates a heating value of the IGBT according to a sum of a switching loss and a conduction loss of the heating element, which are calculated based on the current sensed at the current sensor.

18. The system of claim 16, wherein the controller calculates a ratio between the variation of the estimated temperature and the variation of the measured temperature, and, when a magnitude of the ratio between the calculated variation of the estimated temperature and the calculated variation of the measured temperature exceeds a predetermined value, determines the temperature sensor as failing.

19. The system of claim 16, further comprising:
a cooling system configured to cool the heating element,
wherein the controller controls the cooling system based on the measured temperature when the temperature sensor is determined as not failing, and controls the cooling system based on the estimated temperature or a predetermined temperature value of the heating element when the temperature sensor is determined as failing.

* * * * *